(12) United States Patent
Malek et al.

(10) Patent No.: US 7,419,928 B2
(45) Date of Patent: Sep. 2, 2008

(54) FISCHER-TROPSCH CATALYST PRODUCTION

(75) Inventors: Andrzej M. Malek, Doylestown, PA (US); Stephen C. Leviness, Tulsa, OK (US); Horacio M. Trevino, Annandale, NJ (US); Weldon K. Bell, Ridgeway, IA (US); David O. Marler, Morris Plains, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 470 days.

(21) Appl. No.: 10/819,378

(22) Filed: Apr. 6, 2004

(65) Prior Publication Data

US 2004/0204504 A1 Oct. 14, 2004

Related U.S. Application Data

(60) Provisional application No. 60/462,018, filed on Apr. 11, 2003.

(51) Int. Cl.
*B01J 23/00* (2006.01)
*B01J 21/00* (2006.01)
*B01J 20/00* (2006.01)
*B01J 27/00* (2006.01)
*B01J 29/00* (2006.01)

(52) U.S. Cl. .............. 502/20; 502/305; 502/309; 502/314; 502/315; 502/321; 502/326; 502/329; 502/337; 502/339; 502/439; 502/324

(58) Field of Classification Search .............. 502/20, 502/324, 326, 335, 337, 350, 319, 321, 305, 502/339, 309, 314, 315, 329, 439
See application file for complete search history.

(56) References Cited

U.S. PATENT DOCUMENTS

| | | | |
|---|---|---|---|
| 2,583,619 A | 1/1952 | White ........................ 252/477 |
| 3,244,682 A * | 4/1966 | Czenkusch et al. ............ 526/95 |
| 3,641,096 A * | 2/1972 | Jaffe et al. .................... 502/64 |
| 3,661,798 A | 5/1972 | Cosyns et al. ............... 252/416 |
| 4,089,812 A | 5/1978 | O'Hare et al. ........... 252/466 J |
| 4,399,234 A | 8/1983 | Beuther et al. .............. 518/715 |
| 4,492,774 A | 1/1985 | Kibby et al. ................ 518/713 |
| 4,585,789 A | 4/1986 | Okamoto et al. ............ 514/461 |
| 4,670,414 A | 6/1987 | Kobylinski et al. ......... 502/174 |
| 4,826,799 A | 5/1989 | Cheng et al. ................ 502/301 |
| 4,895,994 A | 1/1990 | Cheng et al. ................ 585/270 |
| 4,910,175 A | 3/1990 | Michel et al. ................. 502/24 |
| 4,977,126 A | 12/1990 | Mauldin et al. ............. 502/242 |
| 5,168,091 A | 12/1992 | Behrmann et al. .......... 502/325 |
| 5,260,239 A | 11/1993 | Hsia ............................. 502/30 |
| 5,268,344 A | 12/1993 | Pedrick et al. ................ 502/30 |
| 5,283,216 A | 2/1994 | Mitchell ....................... 502/30 |
| 5,292,705 A | 3/1994 | Mitchell ..................... 502/325 |
| 5,382,748 A | 1/1995 | Behrmann et al. .......... 585/899 |
| 5,536,694 A | 7/1996 | Schuetz et al. .............. 502/301 |
| 5,928,983 A * | 7/1999 | Culross ....................... 502/170 |
| 6,030,915 A * | 2/2000 | de Boer ........................ 502/39 |
| 6,323,248 B1 * | 11/2001 | Mart et al. ................... 518/709 |
| 6,465,529 B1 * | 10/2002 | Daage et al. ................ 518/709 |
| 6,531,517 B1 * | 3/2003 | Wachter et al. ............. 518/709 |
| 6,531,518 B1 | 3/2003 | Lapidus et al. ............. 518/709 |
| 6,624,204 B1 * | 9/2003 | Daage et al. ................ 518/709 |
| 6,642,281 B1 * | 11/2003 | Long et al. .................. 518/709 |
| 6,696,502 B1 * | 2/2004 | Mart et al. ................... 518/709 |
| 7,122,491 B2 * | 10/2006 | Barton et al. ................. 502/20 |
| 2004/0058807 A1 * | 3/2004 | Werpy et al. ................ 502/180 |

FOREIGN PATENT DOCUMENTS

| EP | 0253924 | 1/1988 |
|---|---|---|
| WO | WO 98/33589 | 8/1998 |
| WO | WO02/20700 A2 | 3/2002 |

OTHER PUBLICATIONS

Suslick et al, Nature, vol. 353, "Sonochemical synthesis of amorphous iron", pp. 414-416 (1991).
Gibson et al, Science, vol. 267, "Synthesis and characterization for anisometric cobalt nanoclusters", pp. 1338-1340 (1995).
Savelov et al, Russian Journal of Physical Chemistry, vol. 62 (11), "Role of Alloying Metals in Raney Ni, Co, and Cu Catalysts", pp. 1537-1540 (1988).
Potoezna-Petru et al, Applied Catalysis, 175, "Influence of oxidation-reduction treatment on the microstructure of $Co/SiO_2$ catalyst", pp. 113-120 (1998).

* cited by examiner

*Primary Examiner*—Cam N. Nguyen
(74) *Attorney, Agent, or Firm*—Estelle C. Bakun

(57) ABSTRACT

A process for enhancing the activity of a catalyst metal particulate for hydrogenation reactions comprising calcining the particulate in an oxidant-containing atmosphere to partially oxidize it thereby forming a porous layer of oxides thereon, treating with an solution capable of oxidizing the calcined metal particulate and comprising a compound of a hydrogenation catalyst metal to where said metal particulate has absorbed a volume of solution equal to at least about 10% of its calculated pore volume and activating it by treatment with a hydrogen-containing gas at elevated temperatures thereby forming a dispersed active metal catalyst. Preferably, the treated particulate is calcined a second time under the same conditions as the first before final activation with a hydrogen-containing gas. The metal particulate is preferably sized after each calcination and any agglomerates larger than 250 microns are comminuted to a desired size.

14 Claims, No Drawings

FISCHER-TROPSCH CATALYST PRODUCTION

This application claims the benefit of U.S. Provisional Application No. 60/462,018 filed Apr. 11, 2003.

This invention relates to a process enhancing the activity of Fischer-Tropsch metal catalysts, such as cobalt.

BACKGROUND OF THE INVENTION

The production of higher hydrocarbon materials from synthesis gas, i.e. carbon monoxide and hydrogen, commonly known as the Fischer-Tropsch ("F-T") process, has been in commercial use for many years. Such processes rely on specialized catalysts. The original catalysts for the Fischer-Tropsch synthesis were nickel. Nickel is still the preferred catalyst for hydrogenation of fats and specialty chemicals. Over the years, other metals, particularly iron and cobalt, have become preferred in the Fischer-Tropsch synthesis of higher hydrocarbons whereas copper has been the catalyst of choice for alcohol synthesis. Cobalt is particularly preferred for Fischer-Tropsch synthesis due its high productivity and comparatively low methane selectivity. As the technology of these syntheses developed over the years, the catalysts have become more refined and have been augmented by other metals and/or metal oxides that function to promote their catalytic activity. Promoter metals or metal oxides include, without intended limitation, Ru, Os, Ir, Mo, W, Cu, Si, Cr, Ti, Mg, Mn, Zr, Hf, Al, Th and the like. It is generally recognized that the choice of a particular metal or alloy for fabricating a catalyst to be utilized in Fischer-Tropsch synthesis will depend in large measure on the desired product or products.

In 1924, M. Raney prepared a nickel hydrogenation catalyst by a process known today as the Raney Process. For purposes of simplicity, the term "Raney" will be utilized herein as a generic term to describe the process, alloys and catalysts obtained thereby. This specific synthesis, in essence, comprises forming at least a binary alloy of metals, at least one of which can be extracted, and extracting it thereby leaving a porous residue of the non-soluble metal or metals that possess catalytic activity. The residue, or non-extractable, catalyst metals are the art-recognized group of metals described above. The extractable metals, typically aluminum, are likewise an art-recognized group. Once alloys are formed of at least one member of each of these groups of metals, they are ground to a fine powder and treated with strong caustic, such as sodium hydroxide, to leach the extractable metal from the residue metal or metals.

There exist many variations of the basic preparation of Raney catalysts such as, for example, deposition of alloys onto a preformed support by flame spraying, (U.S. Pat. No. 4,089,812), formation of the alloy by surface diffusion of aluminum on a non-leachable metal substrate (U.S. Pat. No. 2,583,619), and forming pellets from the powdered alloys for use in fixed bed reactions vessels (U.S. Pat. No. 4,826,799, U.S. Pat. No. 4,895,994 and U.S. Pat. No. 5,536,694). These developments have made possible the use of shaped Raney catalysts in fixed bed reaction vessels.

Particularly suited for the production of hydrocarbons by Fischer-Tropsch synthesis from synthesis gas are Dispersed Active Metals ("DAM") which are primarily, i.e. at least about 50 wt. %, preferably at least 80 wt. %, composed of one or a mixture of metals such as described above and are, without further treatment, capable of catalyzing Fischer-Tropsch synthesis. DAM catalysts may be prepared by any of a number of art-recognized processes. An extensive review of process of forming DAM catalysts can be found in "Active Metals", Edited by Alois Furstner, published by VCH Verlagsgesellschaft mbH, D-69451 Weinheim (FRG) in 1996 and the references cited therein. Methodologies described therein include the Reike method, the use of ultrasound, reduction of metal salts, colloids, nanoscale cluster and powders. Other relevant references include, for example, the preparation of amorphous iron catalyst by high intensity sonolysis of iron pentacarbonyl, Suslick et al., Nature, Vol. 353, pp 414-416 (1991) and the formation of single domain cobalt clusters by reduction of a cobalt salt with hydrazine, Gibson et el., Science, Vol. 267, pp 1338-1340, (1998). Finally, intermetallic alloys, particularly those known for forming metal hydrides, such as $LaCo_5$, can be formed into a fine powder by the application of hydrogen adsorption/desorption cycles. Such catalysts can also be prepared by thermal or chemical decomposition of metal formates or oxalates.

It will be appreciated that a means of producing DAM catalysts having enhanced activity for hydrogenation reactions would be of significant value. In particular, an important aspect of the value of a catalyst for the Fischer-Tropsch process, in addition to its activity, is its selectivity. This property, commonly referred to as "methane selectivity", is the ratio of the percent of feed material converted to desired higher hydrocarbons to that of short chain hydrocarbons produced, primarily methane. In accordance with the present invention, it has been found that DAM catalysts possessing enhanced activity and methane selectivity can be produced from particulate metals, such as Fischer-Tropsch cobalt catalysts, by a process that is both simple and economical.

SUMMARY OF THE INVENTION

In accordance with the present invention, Dispersed Active Metal catalysts having enhanced activity and methane selectivity for the Fischer-Tropsch synthesis are produced by a process wherein, initially, a catalyst metal particulate is calcined in an oxidant-containing atmosphere under conditions sufficient to partially oxidize the metal particulate. The calcined metal particulate is then treated with a solution capable of oxidizing the calcined metal particulate and comprising at least one compound of a hydrogenation catalyst metal. The treatment is conducted under conditions sufficient for the particulate to absorb a volume of the solution equal to at least about 10% of the calculated pore volume thereof. After treatment with the solution, the solution treated particles are preferably dried and then activated by treatment with a hydrogen-containing gas at elevated temperatures thereby forming an active catalyst. In a preferred embodiment prior to the activation step, the particulates are again calcined in an oxidant-containing atmosphere.

DETAILED DESCRIPTION OF THE INVENTION

It is well known in Fischer-Tropsch synthesis chemistry that Group VIII metal surfaces exhibit higher activities for catalytic reactions such as hydrogenation, methanation and Fischer-Tropsch synthesis when subjected to a high temperature oxidation-reduction (O-R) cycle. Such "activation" techniques are reviewed in Applied Catalysis, A. General 175, pp 113-120 (1998) and citations therein. A series of patents, e.g. U.S. Pat. Nos. 4,492,774; 4,399,234; 4,585,789 and 4,670,414 disclose activation of a cobalt catalyst by a reduction/oxidation/reduction (R-O-R) cycle. So far as we are aware, all such oxidation/reduction and reduction/oxidation/reduction cycles described in the literature are effected by treating a supported metal catalyst with an oxygen-containing gas at high temperatures. Metals useful as catalysts in the processes described above are characterized by the capacity to form more than one oxide. Treatment of such metals by either the O-R or R-O-R process results in the formation of the most stable oxide of the metal, for example, in the instance of cobalt, $Co_3O_4$ is formed. For this reason the O-R and R-O-R processes are utilized to activate and enhance the activity of commercial catalyst.

In contrast to the treatment of commercial catalysts as described above, the present invention has as its object the formation of a highly active, selective catalyst layer on particulate metals that catalyze hydrogenation reactions, particularly in Fischer-Tropsch synthesis chemistry.

The catalyst metal particulates treated in accordance with the process of the present invention are selected from the group consisting of metals including, but not limited to, cobalt, ruthenium and nickel, with cobalt and ruthenium being preferred. While it is possible to utilize particulates of more than one of the foregoing group of metals as substrates, generally a single metal will be utilized in the subject process. The particle size range for the metal substrate particulates of the process is generally from about 0.1 micron to 5 millimeters, preferably from about 1 to 50 microns at their significant dimension. It is possible for the catalyst metal to be in a variety of forms such as gauzes, fibers, wools and the like and such forms are included in the scope of the present invention, although it is described in terms of a particulate substrate. Particles are preferred, however, since more surface is available for enhancement of catalytic activity by the subject process. It is also preferred to have the particles treated to be of a relatively uniform particle size. The term "significant dimension" as utilized herein will vary depending on the form of the substrate metal. Wherein the metal is a wire or a spheroid, the significant dimension is the diameter thereof, for an oval or a rhomboid or an irregular shape, the significant dimension is the smallest thickness.

In accordance with the present invention, the catalyst metal particulate is initially calcined in an oxidant-containing atmosphere to partially oxidize it, thereby forming a layer of oxides on at least a portion of the metal particles that materially increases its porosity.

The calcination typically is conducted in a conventional furnace in an oxidant-containing atmosphere. The atmosphere may be air, but is preferably an inert atmosphere containing a controlled amount of oxygen, e.g. such as would be produced as a product gas stream or a waste gas stream from an air separation plant. The concentration of oxygen in the furnace atmosphere is from about 10 ppm to about 21%, preferably from 0.1% to 10% by volume, most preferably from about 1% to 5% by volume, with the remainder being an inert gas, such as nitrogen. The flow volume in the furnace is from about 100 to 10,000, preferably from 1,000 to 5,000 GSHV. This treatment is carried out at elevated temperatures, i.e. from about 200° C. to about 600° C., preferably from about 250° C. to 450° C., most preferably from about 300° C. to 400° C. The pressure of the treatment may be elevated as well, but as a practical matter, atmospheric pressure is preferred. This calcining of the particulate catalyst metal substrate is carried out for a time such that it is only partially oxidized. The resultant oxides are not necessarily the highest oxidation state of the catalyst metal. In addition, the partial oxidation achieved by controlling the three factors of time, temperature and oxygen concentration avoids complete oxidation so that at least a discernible portion of the original substrate is in metallic form. While it may be possible for a single oxide of the metal particulate to be in the layer, generally for those metals that are capable of existing in more than one oxidation state, oxides of both states may be formed by the calcining. Hence, the term "oxides" as utilized herein is specifically intended to include the singular. The resultant oxides layer is not contiguous like a coating and has a high degree of porosity. Hence, it can be reduced to form a porous layer of one or more Dispersed Active Metals possessing enhanced activity. Generally the calcining will require from about 1 to 8 hours, preferably from 1 to about 4 hours to effect the desired degree of oxidation. The presence of porosity on the surface of the metal particulate may be confirmed by recognized techniques such as porosimetry.

The partially oxidized metal particulate is then treated with a solution capable of oxidizing the metal of the particulate and comprising a compound of a metal that catalyzes hydrogenation reactions. Optionally the solution may also contain a compound of a promoter metal. Obviously the solution must be free of any material that would poison or adversely effect the final catalysts.

Suitable compounds that may be utilized to treat the particulate metal substrate in accordance with the present process include, without intended limitation, those of cobalt, ruthenium and nickel, with cobalt and ruthenium being preferred. In a preferred embodiment of the present process, a cobalt-containing porous layer is formed on a dense cobalt metal particulate core for the advantages discussed herein. The promoter metals that may be utilized to treat the particulate metal substrate include, without intended limitation, manganese, zinc, titanium, molybdenum, chromium, tungsten, rhenium, ruthenium, palladium and platinum. Either or both of the metal that catalyzes hydrogenation reactions and the promoter metal for the particulate metal substrate may be present in the activating solution. Examples of suitable compounds of the foregoing metal include, without intended limitation, nitrates, nitrites, nitrosyl compounds, peroxides and the like. Although organic oxidants can be utilized in the process of the present invention, generally inorganic oxidants, such as the nitrates, are preferred. As a general matter, the amount of the oxidant as well as the said one or more metal compounds present in the activating solution will be governed by the solubilities of each in the solvent utilized. It is within the scope of the present invention to utilize more than one of each category of component of the activating solution to take advantage of relative solubilities or capacities of each. The choice of solvent for the solution is dependent primarily on the capacity to dissolve the selected compounds of the added metals, which are preferably salts. The solvent is preferably water, however, other solvents, e.g. certain organic solvents, may be combined therewith provided that they do not introduce any known catalytic poison and that are non-reactive under the conditions of the treatment. Mixtures of water and organic solvents miscible therewith can be utilized as well as mixtures of water with immiscible solvents in combination with suitable dispersing or emulsifying agents present to form a continuous phase, i.e. an emulsion. Such other suitable solvents include hydrocarbons, particularly those derived from the Fischer-Tropsch synthesis, supercritical fluids such as liquid phase light hydrocarbons, i.e. $C_{3-5}$, alkanes, cyclopentane and the like. Preferred mixed solvents include, without any intended limitation, water/lower alkanols, water/Fischer-Tropsch products, and water/alkanols/alkanes.

The concentration of the metal compound or compounds in the activating solution may range from 0.1 to 20 weight percent on the basis of the metal itself. Preferably, the solution will contain from about 1 to 15 weight percent of the metal that catalyzes hydrogenation reactions and from about 0.1 to 5 weight percent of the promoter metal. The weight ratio of the activating solution used to the catalyst metal particulate can be varied from about 0.01 to 100, preferably from about 0.1 to 5. In the instance as discussed above where the added catalyst metal in the solution is the same as the particulate metal, the above percentages are still based only on the solution. The treating solution will typically contain a sufficient amount of dissolved ingredients to provide from about 10 ppm to 20 percent by weight of the oxidant.

The treatment of the partially oxidized metal substrate particulate described herein may be carried out in any reactor apparatus generally suitable for slurry reactions including, without intended limitation, fixed bed reactors, moving bed reactors, fluidized bed reactors, slurry reactors, bubbling bed reactors and the like. Treatment with the activating solution may be effected, for example, by means of drop-wise addition of the solution to the substrate, by spraying the solution onto the substrate, or by the addition of the catalyst metal particulate to an amount of said solution in excess of that required to achieve incipient wetness of said particulate. The treatment will typically be carried out until the metal particulate has absorbed a volume of solution equal to at least about 10% of its calculated pore volume of the calcined particulate and preferably to where conditions of incipient wetness are attained. By incipient wetness is meant that the substrate catalyst has adsorbed an amount of solution generally equivalent to its calculated pore volume. Pore volume is a discernible quantity that can be measured directly or indirectly by known techniques such as porosimetry. The volume of impregnating solution contemplated will vary from 10% to 1,000% of the calculated pore volume of the catalyst. Preferably, the volume of treatment solution will be from 30% to 200%, most preferably from about 70% to 100% of the calculated pore volume of the catalyst particulate.

The treatment will typically require from 1 minute to 24 hours, preferably from about 5 to 60 minutes. The time required for the treatment will vary depending on factors such as the catalyst metal particulate being treated, the quantity thereof, the composition of the treatment solution, the reactor configuration and the like. The treatment is carried out at a temperature below about 100° C., preferably below about 50° C., and most preferably at room temperature, i.e. 20°-25° C. Certain of the reactions contemplated herein, e.g. those where nitrate salts are utilized, are exothermic with the evolution of ammonia. In those instances, the temperature is controlled within the ranges given by controlling the rate of addition. Alternatively, maintaining the concentration of the salt in the solution at a comparatively low level will assure temperature control.

Once the treatment is concluded, the substrate metal particles are preferably dried. Under certain conditions, e.g. where minimal treatment solution is utilized or where the reactions are exothermic as discussed above, it may not be necessary to dry the particles. Conversely, if the treatment is carried out in sufficient solution to warrant it, the particles are initially recovered, generally by physical separation, e.g. filtration or sieving. The drying procedure is carried out in a conventional oven, preferably at a temperature of from about 50° C. to 150° C. Again, although an inert atmosphere could be utilized, in view of the reactions described, drying may be carried out in air. Typically, from about 1 to 24 hours are required for the drying operation. It is preferred to continuously mix the treated metal particles during the drying operation. It is within the scope of the present invention to utilize vacuum drying to enhance the speed of the process, if so desired.

In a preferred embodiment, the treated metal particulate is again calcined, thereby forming additional oxides in the layer from the at least one compound of a metal as described above that has been absorbed from the solution and, as a result, increasing the porosity thereof. The conditions of the second calcination are as described above for the initial treatment of the catalyst metal particulate. Also preferably, the resulting particulates are again sized as described above in the event any agglomerates may have formed that are too large.

The initial calcination and the subsequent treatment of the metal particulate with the solution as described, as well as the preferred second calcining step, may tend to form agglomerates of the catalyst metal particles. Therefore, in order that such agglomerates are not too large, it is preferred in accordance with the present invention that the particulate be sized after calcining and any agglomerates larger than 250 microns comminuted, thereafter retaining particulates at least 10 microns, and preferably between about 16 and 100 microns at their largest dimension.

The porous layer of the impregnated metal particulate substrate according to the invention is then converted to a layer of Dispersed Active Metal catalyst by reduction with a hydrogen-containing gas at elevated temperatures, i.e. temperatures of from about 200° C. to 600° C., preferably from about 250° C. to 400° C. Hydrogen partial pressure during the reduction would range from about 0.01 to 100 atmospheres, preferably from about 0.1 to 40 atmospheres. The process of the present invention enhances the activity of the original catalyst metal both in terms of productivity and methane selectivity.

The catalyst particles formed in accordance with the process of the invention are useful in synthesis processes for the formation of higher hydrocarbons wherein liquid and gaseous products are formed by contacting a syngas comprising a mixture of hydrogen and carbon monoxide with shifting or non-shifting conditions, preferably the latter in which little or no water gas shift takes place. The process is carried out at temperatures of from about 160° C. to 260° C., pressures of from about 5 atm to about 100 atm, preferably from 10 to 40 atm, and gas space velocities of from about 300 V/Hr/V to about 20,000 V/Hr/V, preferably from about 1,000 V/Hr/V to about 15,000 V/Hr/V. The stoichiometric ratio of hydrogen to carbon monoxide is about 2.1:1 for the production of higher hydrocarbons. This ratio can vary from about 1:1 to 4:1, preferably from 1.5:1 to 2.5:1, more preferably from 1.8:1 to 2.2:1. These reaction conditions are well known and a particular set of reaction conditions can readily be determined from the parameters given herein. The reaction may be carried out in virtually any type of reactor, e.g. fixed bed, moving bed, slurry bubble column, fluidized bed and the like. The hydrocarbon-containing products formed in the process are essentially sulfur and nitrogen free.

The hydrocarbons produced in a process as described above are typically upgraded to more valuable products by subjecting all or a portion of the $C_{5+}$ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLE 1-11

The following materials were prepared for testing for catalytic activity as described below:

Example 1a—Commercial cobalt powder without modification, 2μ particle size.

Example 1b—Commercial cobalt powder without modification, 40μ particle size.

Example 2a—Two micron cobalt powder treated with water to incipient wetness and dried at 60° C.

Example 2b—Forty micron cobalt powder treated as in Example 2a.

Example 3a—Ten grams of the 2μ cobalt powder was calcined in nitrogen containing 1% oxygen at a gas flow of 2,400 GHSV. The temperature was ramped at 2° C. per minute to 300° C. and held for one hour.

Example 3b—Ten grams of 40μ cobalt powder treated as in Example 3a.

Example 4—Twenty Five grams of the 2μ cobalt powder was calcined in nitrogen containing 1% oxygen at a gas flow of 1,000 GHSV. The temperature was ramped at 2° C. per minute to 250° C. and held for eight hours.

Example 5—Treatment of 11.01 g of the sample from Example 4 to the point of incipient wetness consumed 5.07 g of a solution of 0.35 g of perrhenic acid (54% Re) in 7.66 mL of distilled water. The sample was dried at 60° C. in air.

Example 6—Seven grams of the Example 5 powder was calcined in nitrogen containing 1% oxygen at a gas flow of 3,000 GHSV. The temperature was ramped at 2° C. per minute to 300° C. and held for one hour.

Example 7—Treatment of 11.01 g of the sample from Example 4 to the point of incipient wetness consumed 4.54 g of a solution of 1.17 g of perrhenic acid (54% Re) in 6.88 mL of distilled water. The sample was dried at 60° C. in air.

Example 8—Seven grams of the Example 7 powder calcined in nitrogen containing 1% oxygen at a gas flow of 3,000 GHSV. The temperature was ramped at 2° C. per minute to 300° C. and held for one hour.

Example 9—Twenty Five grams of the 2μ cobalt powder was calcined in nitrogen containing 5% oxygen at a gas flow of 1,000 GHSV. The temperature was ramped at 1° C. per minute to 400° C. and held for eight hours.

Example 10—Treatment of 11.02 g of the sample from Example 9 to the point of incipient wetness consumed 3.55 g of a solution of 0.35 g of perrhenic acid (54% Re) in 7.64 mL of distilled water. The sample was dried at 60° C. in air.

Example 11—Treatment of 11.05 g of the sample from Example 9 to the point of incipient wetness consumed 4.01 g of a solution of 1.17 g of perrhenic acid (54% Re) in 6.82 mL of distilled water. The sample was dried at 60° C. in air.

Example 12—The samples prepared in the preceding Examples were tested for catalytic activity by the following procedure. The tests were conducted in stainless steel, fixed bed reactors at the standard conditions of 200° C. and 285 psig. The catalyst charge to the reactor was between 1.0 and 1.8 g. Due to the exothermic nature of the Fischer-Tropsch reaction, each sample was mixed with a diluent of acid-washed quartz in a weight ratio of at least 8:1 diluent to catalyst. The feed to the reactor was premixed synthesis gas having a molar concentration of 31% carbon monoxide, 64% hydrogen and 5% nitrogen. The reactor effluent was first depressed and then flowed through two traps designed to condense liquid products. The first trap was maintained at 125° C. and the second at 1° C. The gaseous product flowing out of the second trap was analyzed by gas chromatography to determine CO conversion and methane selectivity. CO conversion was calculated by using the nitrogen in the feed as an internal standard. From the CO conversion value, the hydrocarbon productivity can be derived and is expressed as weight of hydrocarbon produced per unit weight of catalyst per unit time.

For all catalysts, an activation step was carried out in pure flowing hydrogen prior to initiating the flow of synthesis gas. A temperature of 350° C. was used at standard for the activation step. A high hydrogen space velocity (40,000 $h^{-1}$) was used during activation to eliminate possible detrimental effects of a high partial pressure of steam, which is formed as the cobalt oxide precursor is converted into metallic cobalt. The activation procedure began by slowly ramping the temperature at 1° C./min to 100° C., which was then maintained for two hours to dry the sample and the temperature again ramped at the same rate to 350° C. and held for three hours.

After activation, the reactor was cooled to 180° C. under flowing hydrogen. Once the temperature was stabilized at 180° C., the pressure was raised to reaction pressure and the feed switched to synthesis gas. The initial exposure of the catalyst material to synthesis gas was done at low temperature utilizing a high space velocity of at least 6000 $h^{-1}$ to prevent harmful effects to the catalyst in an initially hydrogen-rich environment. After approximately 30 minutes at 180° C., allowing some wax to form inside the catalyst pores and achieving a steady hydrogen/carbon monoxide ratio similar to that of the syngas feed, the temperature was ramped at 1° C./3 min to 190° C. and then held for 75 minutes. During this period, the syngas flow was adjusted to achieve a projected CO conversion of between about 50 and 60% at 200° C. The temperature was then ramped at 1° C./3 min to 200° C. and held for the remainder of the experiment. Once this temperature was attained, the flow rate was then adjusted, if necessary, to achieve the desired CO conversion of between about 50 and 60%. Catalyst productivity, measured in grams of hydrocarbon produced per kilogram of catalyst per hour ($g_{hc}$/$kg_{cat}$/h) and methane selectivity are reported at the standard time on stream of 5 h after syngas was initially admitted into the system. The results are shown in Table 1, wherein any value given as n.m. was not measurable.

It will be seen from the results reported in Table 1 that only the finer untreated cobalt powder gave a measurable response with low productivity and high methane selectivity. The powder impregnated with water had low productivity with the smaller particles being superior to the larger ones. The smaller calcined cobalt particles had a higher productivity whereas the larger particles showed no measurable activity. Example 4 shows that calcining smaller particles at a lower temperature than in Example 3a lowered the catalyst productivity. Example 9, on the other hand, shows that calcining at a higher temperature produced a moderate increase in productivity. Initially calcining the two micron cobalt particles followed by impregnation with a promoter solution, as in Example 5, raised the activity and lowered the methane selectivity in comparison to that formed in Example 4 that did not have the promoter impregnated therein. The particles of Example 7, impregnated with rhenium in higher concentration than Example 5 showed substantial improvement thereover as well as improvement over Example 4. Increasing the rhenium promoter concentration and calcination temperature resulted in higher productivity and methane selectivity. The materials formed in Examples 10 and 11 demonstrate the beneficial effect of increasing the concentration of the promoter under otherwise identical conditions. The activity of the samples prepared in the various Examples is presented in Table 1.

C., 5% oxygen) used for Example 9, resulted in catalytic particles having only slightly higher activity in spite of the more extensive oxidation. This demonstrates that the majority of catalytic sites are located on the surface of the particles and that moderate calcination is sufficient to activate the particles thereby improving their performance.

A further improvement in the catalytic activity of the cobalt powders tested is achieved by incorporating a promoter, such as rhenium, after the initial activation by calcination. The beneficial effect of the promoter is seen by comparing Example 4 (unpromoted), Example 5 (low level of Re) and Example 7 (higher level of Re). The enhancement resulting from the addition of the promoter is observed regardless of whether the cobalt powder had been initially activated by controlled oxidation at mild or more severe conditions. Examples 9, 10 and 11, all initially calcined at 400° C., show that increased levels of rhenium produced comparable increases in catalytic activity.

Further improvement in catalytic activity is realized by calcining the catalyst after impregnating it with the rhenium promoter, rather than merely drying it. Thus, an optimized

TABLE 1

| Example/ Comparative Example No. | Sample Number | Particle size (Microns) | Percent CO Conversion | Productivity ($g_{hc}/kg_{cat}/h$) | % Methane Selectivity |
|---|---|---|---|---|---|
| Comparative 1 | 1a | 2 | 5 | 8 | 12 |
| Comparative 2 | 1b | 40 | n.m. | n.m. | n.m. |
| Comparative 3 | 2a | 2 | 38 | 8 | 6.9 |
| Comparative 4 | 2b | 40 | 2 | <1 | 12.9 |
| Comparative 5 | 3a | 2 | 25 | 22 | 8.8 |
| Comparative 6 | 3b | 40 | n.m. | n.m. | n.m. |
| Example 1 | 4 | 2 | 21 | 20 | 4.3 |
| Example 2 | 5 | 2 | 54 | 25 | 5.1 |
| Example 3 | 6 | 2 | 43 | 46 | 5.2 |
| Example 4 | 7 | 2 | 61 | 78 | 5.0 |
| Example 5 | 8 | 2 | 57 | 102 | 4.7 |
| Example 6 | 9 | 2 | 29 | 29 | 6.1 |
| Example 7 | 10 | 2 | 36 | 66 | 5.6 |
| Example 8 | 11 | 2 | 59 | 95 | 5.1 | n.m. indicates not measurable.

Untreated cobalt powder has very low catalytic activity for the Fischer-Tropsch reaction as evidenced by Examples 1a and 1b. It is evident that further activation of the particulate surface is necessary. The effect of the difference in particle size is shown by comparing several pairs of catalysts, Examples 1a and 1b, 2a and 2b and 3a and 3b. In each case, the catalyst having the smaller particle size demonstrates greater catalytic activity per unit weight than that having larger particle size.

Impregnation of cobalt particles with pure water does not appreciably affect catalytic activity. This can be seen from the similar catalytic performance of Sample 2a, which was impregnated with water, and Sample 1a, which was not. A similar comparison can be made between larger particulate Examples 2b and 1b. Calcination of the cobalt powder enhances the catalytic activity in comparison with untreated cobalt powder. This improvement is readily seen by comparing Example 3a (2 micron cobalt particles calcined at 300° C.) with Example 1a, uncalcined particles of the same size.

The activating effect of calcination of the metal particulate can be seen even at comparatively mild conditions. Powders calcined at moderate conditions, such as Examples 3a and 4, calcined in a 1% oxygen atmosphere at 300° C. and 250° C., respectively, have similar catalytic activity, clearly higher that that of the untreated powder. A more severe treatment (400° pretreatment sequence for the activation of cobalt powders includes an initial calcination, followed by rhenium impregnation and a second calcination. The catalyst is then reduced in hydrogen as described above. The advantage of the second calcination step after incorporation of the promoter can be seen by comparing Examples 6 and 8, which underwent a second calcination, with Example 5 and 7, which were merely dried. The results reported in Table 1 clearly demonstrate the advantage of the process of the present invention and the superior catalysts produced thereby.

What is claimed is:

1. A process for the production of an enhanced activity catalyst for hydrogenation reactions comprising:
    a) calcining a metal particulate substrate selected from the group consisting of cobalt metal, nickel metal, ruthenium metal and mixtures thereof in an oxidant-containing atmosphere under conditions sufficient to partially oxidize the metal of the metal particulate substrate to form a porous layer of oxides of the metal on a portion of the metal particulate substrate;
    b) treating said calcined metal particulate substrate having oxides thereon with a solution capable of oxidizing the metal of the calcined metal particulate substrate and comprising i) a compound of a hydrogenation catalyst metal selected from the group consisting of nickel, cobalt and ruthenium and mixtures thereof, (ii) a compound of a promoter metal, or iii) a mixture of i) and ii) under conditions sufficient for the calcined metal particulate substrate to absorb a volume of said solution equal to at least about 10% of the calculated pore volume of the calcined metal particulate substrate; and c) activating said treated calcined metal particulate substrate with a hydrogen-containing gas at elevated temperature thereby forming a dispersed active metal catalyst.

2. The process in accordance with claim 1, wherein the metal of the metal particulate, of the hydrogenation catalyst metal compound in solution, or both is cobalt.

3. The process in accordance with claim 1, wherein said promoter metal is selected from the group consisting of manganese, zinc, titanium, molybdenum, chromium, tungsten, rhenium, ruthenium, palladium, platinum and mixtures thereof.

4. The process in accordance with claim 1, wherein the calcining atmosphere in step a) is from about 10 ppm to 21% by volume oxygen with the remainder being an inert diluent gas.

5. The process in accordance with claim 1, wherein the solution in step b) contains both a promoter metal compound and a compound of a hydrogenation catalyst metal.

6. The process in accordance with claim 1, wherein said compound of said metal in the solution in step b) is selected from the group consisting of nitrates, nitrites, nitrosyl compounds, permanganates, carboxylates and chelates.

7. The process in accordance with claim 1, wherein the solvent for the solution in step b) is water or water and an organic solvent miscible therewith.

8. The process in accordance with claim 1, wherein step b) is carried out at room temperature.

9. The process in accordance with claim 1, wherein the treated catalyst metal particulate substrate formed in step b) is dried at a temperature of from about 50° to 150° C.

10. The process in accordance with claim 1 additionally including the steps of calcining the treated particles formed in step b) in an oxidant-containing atmosphere.

11. The process of claim 1 or claim 10 additionally including the step of comminuting any agglomerates formed that are larger than about 250 microns.

12. The process of claim 1 wherein the catalyst metal particulate substrate is cobalt and the treating solution of step b) is perrhenic acid.

13. The process of claim 1 wherein the catalyst metal particulate substrate has a particle size range of from about 0.1 micron to 5 millimeters.

14. The process of claim 1 wherein the catalyst metal particulate substrate is gauze, fiber, wool, wire or spheroid in form.

* * * * *